(12) United States Patent
Ferolito (10) Patent No.: US 7,283,558 B2
(45) Date of Patent: Oct. 16, 2007

(54) DISTRIBUTED WEIGHTED FAIR ARBITRATION AND FORWARDING

(75) Inventor: Philip Ferolito, Sunnyvale, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 1018 days.

(21) Appl. No.: 10/449,627

(22) Filed: May 30, 2003

(65) Prior Publication Data

US 2003/0223420 A1  Dec. 4, 2003

Related U.S. Application Data

(60) Provisional application No. 60/385,991, filed on Jun. 4, 2002.

(51) Int. Cl.
*H04L 12/64* (2006.01)

(52) U.S. Cl. .................. 370/462; 370/230; 370/413

(58) Field of Classification Search ................ 370/230, 370/412, 413, 428, 429, 462
See application file for complete search history.

(56) References Cited

U.S. PATENT DOCUMENTS

| | | | |
|---|---|---|---|
| 5,469,439 A | 11/1995 | Thaler et al. | 162/4 |
| 5,519,709 A | 5/1996 | Albrecht et al. | 370/407 |
| 5,526,344 A * | 6/1996 | Diaz et al. | 370/364 |
| 6,011,775 A | 1/2000 | Bonomi et al. | 370/230 |
| 6,032,218 A | 2/2000 | Lewin et al. | 710/240 |
| 6,487,213 B1 | 11/2002 | Chao | 370/418 |
| 2002/0089977 A1 | 7/2002 | Chang et al. | 370/386 |

* cited by examiner

*Primary Examiner*—John Pezzlo (57) ABSTRACT

Multi-stage arbitration at a switching fabric. The switching fabric includes a traffic profiler that generates a request for a cell with a specified traffic class. The switching fabric includes a first stage arbitration between traffic classes of cells enqueued at the switching fabric that modifies the request. The switching fabric further includes a second stage arbitration between cells enqueued at the switching fabric that uses the modified request.

19 Claims, 7 Drawing Sheets

DISTRIBUTED WEIGHTED FAIR ARBITRATION AND FORWARDING

CROSS REFERENCE TO RELATED APPLICATION

This application is entitled to the benefit of provisional Patent Application Ser. No. 60/385,991, filed Jun. 4, 2002.

FIELD OF THE INVENTION

The present invention relates generally to cell-based traffic arbitration, and more particularly to arbitration to maximize fabric throughput while providing priority biasing.

BACKGROUND OF THE INVENTION

A good switch arbitration algorithm is an important component of any highspeed switch, router, bridge, or other switching device. The objective of maintaining a high throughput while maintaining certain fairness standards makes the switch arbitration problem a nontrivial one. While a number of approaches have been proposed, it is still a fairly open problem with an ongoing quest for satisfactory solutions.

A typical switch includes an ingress, a switching fabric, and an egress. Network traffic arrives at the ingress and is forwarded through the switching fabric to the egress. In high-speed routers, the most common switch architecture is a crossbar. Among the ingresses of a crossbar switch, there may be a number of cells targeting the same egress.

There are two key measures of the performance of a switch scheduler. First is throughput, which is a measure of egress channel utilization. A scheme that leads to egress ports sitting idle at times is clearly not a good scheme. The other measure of performance is fairness. Each incoming flow should get a fair chance to send and not be starved, but when flows are of different priorities they should be forwarded accordingly. The problem then becomes even more complicated.

Coming up with an algorithm that maximizes performance with respect to throughput, fairness, and priority is a very difficult task. The problem grows even more difficult with the increased complexity and number of ports in modern switches. Crossbar size increases quadratically with the number of ports. As complexity increases, computation time decreases. While there may be good algorithms for arbitration, a solution that can be implemented quickly is of greatest importance. In the absence of such a solution, switch arbitration could become a performance-degrading bottleneck.

The switch arbitration problem is the problem of matching incoming cells to egresses. Each cell targets an egress, based upon its destination. (Unicast cells target one egress, while multicast cells may target multiple egresses). In the simplest case, incoming cells are stored in a first-in-first-out (FIFO) queue at the ingress. However, when a cell at the head of the queue targets an egress that is busy, the cell will block all other cells in the queue from being forwarded. For example, a cell that targets a free egress will not be transferred if it is not at the head of the FIFO queue. This is referred to as head-of-line (HOL) blocking. To solve the HOL blocking, each cell at the ingress could be stored in a different buffer. This improves performance but makes the problem significantly more complicated, essentially a complicated bi-partite graph matching problem.

Additional complexity comes from, for example, setting priorities for certain queues or making quality of service (QoS) guarantees. In some cases, different scheduling algorithms may be selected for use with different subsets of queues. The two most popular scheduling algorithms are strict priority and weighted fair queuing (WFQ). With strict priority, cells are forwarded from higher priority queues first. This algorithm is relatively straightforward to implement. However, a strict priority policy may allow higher priority traffic to completely starve lower priority traffic. With WFQ, the scheduler applies a weight to each queue and then uses a round robin algorithm tempered by the weights. Weights are generally assigned relative to the proportion of bandwidth allocated for each queue. WFQ algorithms are more difficult to implement than strict priority, but are used anyway because of the desire to avoid starving lower priority traffic. However, many of these algorithms, such as longest queue first (LQF), become excessively difficult and costly to implement in high-speed switches. Though not as popular, it should be noted that round robin algorithms work just as well as weighted algorithms when traffic has a uniform pattern. However, if traffic is non-uniform, some Ingresses might be loaded more than others, making round robin unfair in some cases. Strict priority and WFQ are often combined in a two-level scheme so that highest priority traffic is sent first in accordance with strict priority, and lower priority traffic is sent according to the WFQ algorithm. However, this introduces dependencies that undermine the quality of the solution. Another approach is to centralize arbitration to achieve maximum control, but as a switching fabric increases in size, the complexity of a centralized arbitration increases dramatically. Accordingly, the search continues for improved arbitration algorithms.

Due to the difficulty in implementing an arbitration algorithm with a balance of fairness and throughput, as well as a priority bias, a new priority-biased arbitration that maximizes throughput while maintaining fairness is desirable. The algorithm should be practical for implementation in a high-speed switch and sufficiently simple that the switch does not become a network bottleneck. Preferably, the implementation is scalable to larger, more complex switches.

SUMMARY OF THE INVENTION

A technique for traffic forwarding involves performing multi-stage arbitration in a switching fabric. The multi-stage arbitration includes traffic profiling, a first stage arbitration, and a second stage arbitration. Traffic profiling involves generating a traffic profile request for use in the first stage arbitration. The first stage arbitration uses the traffic profile request to arbitrate between traffic classes. The first stage arbiter then modifies the traffic profile request to match the traffic class that wins arbitration. One condition for winning arbitration is that a cell enqueued at the switching fabric has the winning traffic class. The first stage arbiter has a fixed number of bits in a request from the traffic profiler ($\log_2 N$, where N is the number of exit channels), a fixed number of signals to the second stage arbiter ($\log_2 N$, where N is the number of exit channels), and a fixed number of signals to the second stage arbiter (1/exit channel), regardless of the size of the switching fabric. The second stage arbiter receives the modified traffic profile request and arbitrates between cells enqueued at the switching fabric. Since the modified traffic profile request always includes the traffic class of a cell enqueued at the switching fabric, the traffic profile request reduces arbitration complexity at the second stage arbitration. By performing the arbitration in stages, system complexity is reduced sufficiently to allow arbitration with, for example, a priority-bias without eliminating fairness. Moreover, reduced system complexity improves scalability.

In an embodiment, a method of arbitration at a switching fabric includes receiving cells from an ingress, wherein each of the cells has an associated traffic class of a plurality of traffic classes, generating a request at a traffic profiler, performing a first stage arbitration to modify the request according to which traffic classes of the plurality of traffic classes are represented by cells received from the ingress that have the traffic classes, performing a second stage arbitration using the modified request to select a cell of the cells received from the ingress as winner of the multi-stage arbitration, and forwarding the cell to an egress.

In another embodiment, a traffic forwarding system having one or more channels of entry (COE) and one or more exit channels includes a receive module configured to receive traffic on COE, wherein the received traffic includes cells with associated traffic classes, a fabric buffer module configured to enqueue cells received by the receive module according to the associated traffic classes and the COE, a traffic profiler module configured to generate a request for a cell with a specified traffic class, the traffic profiler including a traffic profile table with entries having fields associated with traffic classes and a request generator configured to generate requests including one or more of the fields of the entries, a multi-stage arbitration engine configured to receive the request from the traffic profiler module, including a first stage arbiter, configured to arbitrate between traffic classes of the cells received at the receive module and modify the request accordingly and a second stage arbiter, configured to arbitrate between the cells received at the receive module using the modified request, and a transmit module configured to forward cells that win arbitration at the multi-stage arbitration engine on one of one or more exit channels.

In another embodiment, an arbitration engine configured to arbitrate between one or more cells enqueued at a switching fabric includes a first stage arbiter and a second stage arbiter. The first stage arbiter is configured to receive a traffic profile request, receive a plurality of traffic class flags associated with a respective plurality of traffic classes, wherein a traffic class flag is indicative of whether one or more cells enqueued at a switching fabric have the associated traffic class of the traffic class flag, arbitrate between traffic classes, for which one or more cells are enqueued, according to arbitration parameters, and modify the traffic profile request in accordance with the arbitration. The second stage arbiter is configured to receive the modified traffic profile request from the first stage arbiter and arbitrate between the enqueued cells according to the modified traffic profile request and arbitration parameters.

Using the above-described techniques, weighted arbitration at a switching fabric is achieved with fairness.

Exemplary figures illustrate embodiments of the invention. Other aspects and advantages of the present invention will become apparent from the following detailed description, taken in conjunction with the accompanying drawings, illustrating by way of example the principles of the invention.

DETAILED DESCRIPTION OF THE INVENTION

As shown in the drawings for the purposes of illustration, an embodiment of the invention is a traffic forwarding system configured for use in a network with cell-based traffic. The system includes a switching fabric module configured to receive cell traffic from an ingress and forward the cell traffic to an egress. The switching fabric module performs traffic profiling followed by a multi-stage arbitration to ensure priority bias with fairness without excessive complexity.

Figure 1:
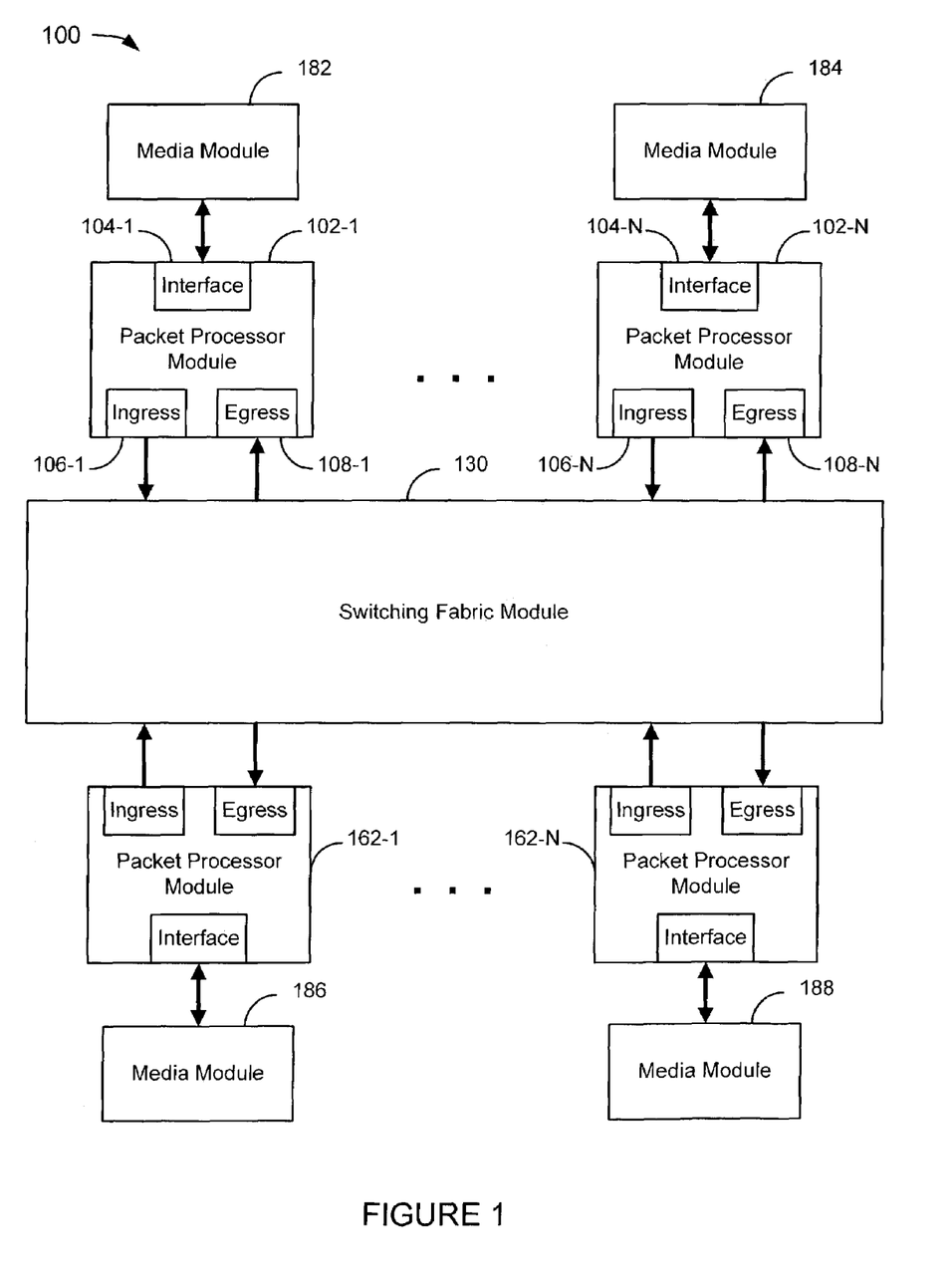
FIG. 1 is a block diagram of a traffic forwarding system in accordance with an embodiment of the invention.

FIG. 1 is a block diagram of a traffic forwarding system 100 in accordance with an embodiment of the invention. The system 100 includes media modules 182, 184, 186, and 188, packet processor modules 102-1 to 102-N (referred to collectively as the packet processor modules 102) and 162-1 to 162-N (referred to collectively as the packet processor modules 162), and switching fabric module 130. The media modules 182, 184, 186, and 188 are respectively coupled to the packet processor modules 102-1, 102-N, 162-1, and 162-N. It should be noted that in an embodiment each packet processor module may be coupled to two or more media modules (not shown). The packet processor modules 102 and 162 are coupled to the switching fabric module 130 by, for example, high-speed interfaces. The switching fabric includes circuitry to replicate cells by writing to multiple buffers. This functionality is used to replicate multicast cells that target a plurality of destinations. It should be noted that in an embodiment, the switching fabric includes two or more switching fabric modules. The packet processor module 1021 includes an interface module 104-1 for forwarding packets to and from the media module 182, an ingress module 106-1 for forwarding cells to the switching fabric module 130, and an egress module 108-1 for receiving cells from the switching fabric module 130. The packet processor modules 102 and 162 have comparable components and couplings. In an embodiment, the interface modules 104 are configured to receive packets. If a packet is too large to fit in a single cell, it is broken into portions and each portion is encapsulated in a separate cell.

Figure 2:
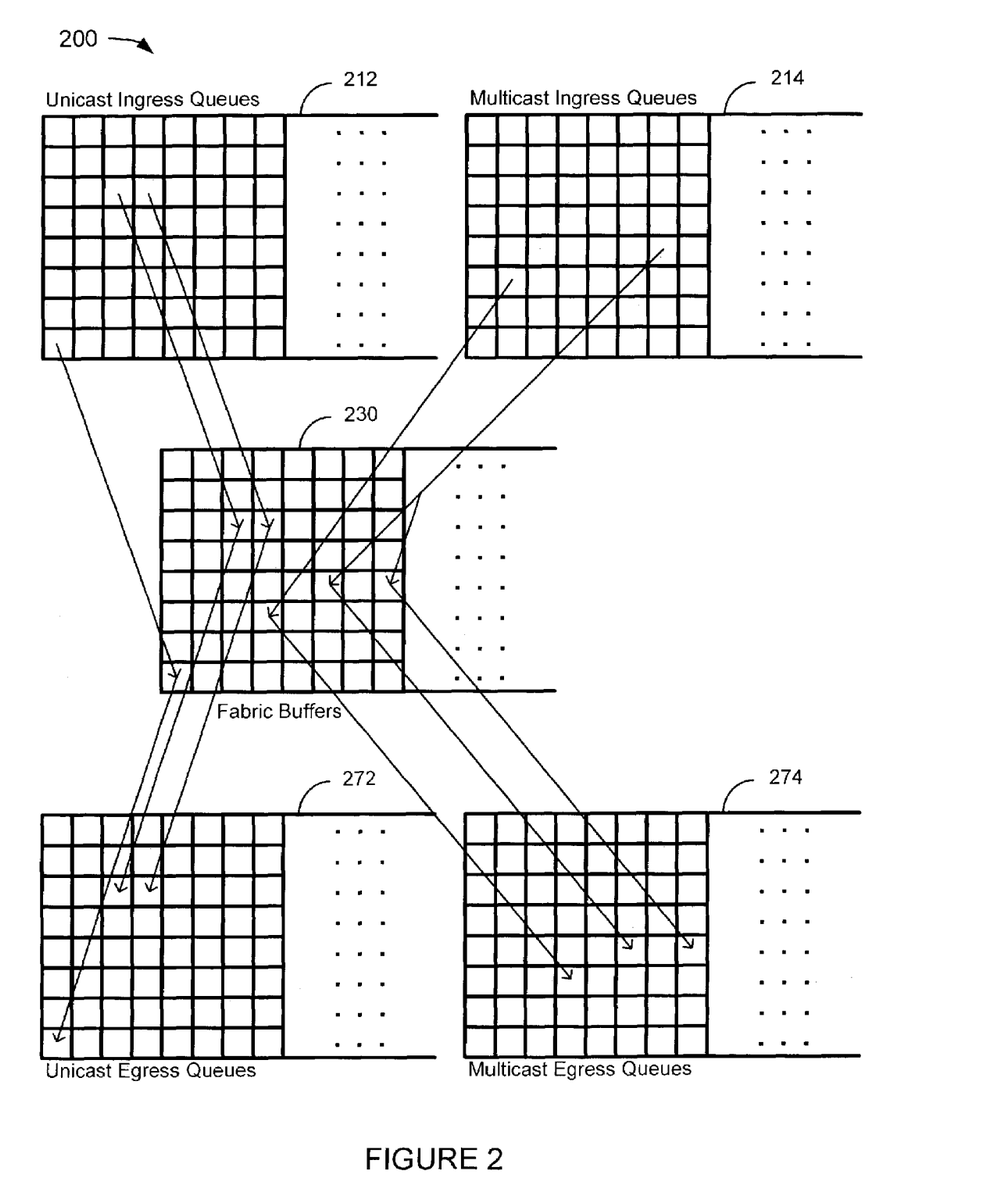
FIG. 2 depicts an example of the forwarding of data through a fabric buffer in accordance with an embodiment of the invention.

FIG. 2 depicts an example of the forwarding of data through fabric buffers 230 in accordance with an embodiment of the invention. A system 200 includes unicast ingress queues 212, multicast ingress queues 214, the fabric buffers 230, unicast egress queues 272, and multicast egress queues 274. In an embodiment, the unicast ingress queues 212 and multicast ingress queues 241 are in an ingress module such as the ingress module 106-1 (FIG. 1), the fabric buffers 230 are in a switching fabric module such as the switching fabric module 130 (FIG. 1), and the unicast egress queues 272 and multicast egress queues 274 are in an egress module such as the egress module 108-1 (FIG. 1). The unicast ingress queues 212 are divided into 8 rows that represent 8 priorities and a variable number of columns. In an exemplary embodiment, the number of columns is 64, which represents the number of egress queues in the system. The fabric buffers 230 are divided into a like number of buffers (e.g., 8×64) for each ingress queue. The unicast egress queues 272 are also divided into a like number of queues (e.g., 8×64), where each queue corresponds to a unique priority-ingress combination. The multicast ingress queues 214 are similarly divided into 8 rows that represent 8 priorities, but the number of columns is arbitrary and does not necessarily correspond to the number of columns in the fabric buffers 230 and the multicast egress queues 274. In an embodiment, the number of columns in the multicast ingress queues 214 is 32. The fabric buffers 230 do not distinguish between unicast and multicast. The multicast egress queues 274 correspond to the fabric buffers 230, so there are 8×64 multicast egress queues 274 in this example. In an embodiment, header information associated with a cell is used to determine to which egress the cell should be forwarded.

The unicast ingress queues 212 are respectively associated with the fabric buffers 230. Accordingly, a unicast cell in a unicast ingress queue is forwarded to the fabric buffer that corresponds to the unicast ingress queue. Similarly, the fabric buffers 230 are respectively associated with the unicast egress queues 272. Since the unicast ingress queues 212 are respectively associated with the fabric buffers 230 and the fabric buffers 230 are respectively associated with the unicast egress queues 272, if follows that the unicast egress queues 272 are respectively associated with the unicast ingress queues 212. FIG. 2 illustrates three exemplary unicast cells targeting three queues of the unicast egress queues 272 through three corresponding buffers of the fabric buffers 230, from three corresponding queues of the unicast ingress queues 212.

As shown in FIG. 2, each multicast ingress queue may or may not correspond to a fabric buffer in the fabric buffers 230. In FIG. 2, two exemplary multicast cells target one or more queues of the multicast egress queues 274. The first exemplary multicast cell from a first multicast ingress queue of the multicast ingress queues 214 targets a first multicast egress queue of the multicast egress queues 274. The second exemplary multicast cell is written to a plurality of fabric buffers in accordance with multicast destinations. Any of the exemplary multicast cells may target additional multicast egress queues (not shown), depending upon whether other multicast egress queues are represented in their respective multicast destinations.

Figure 3:
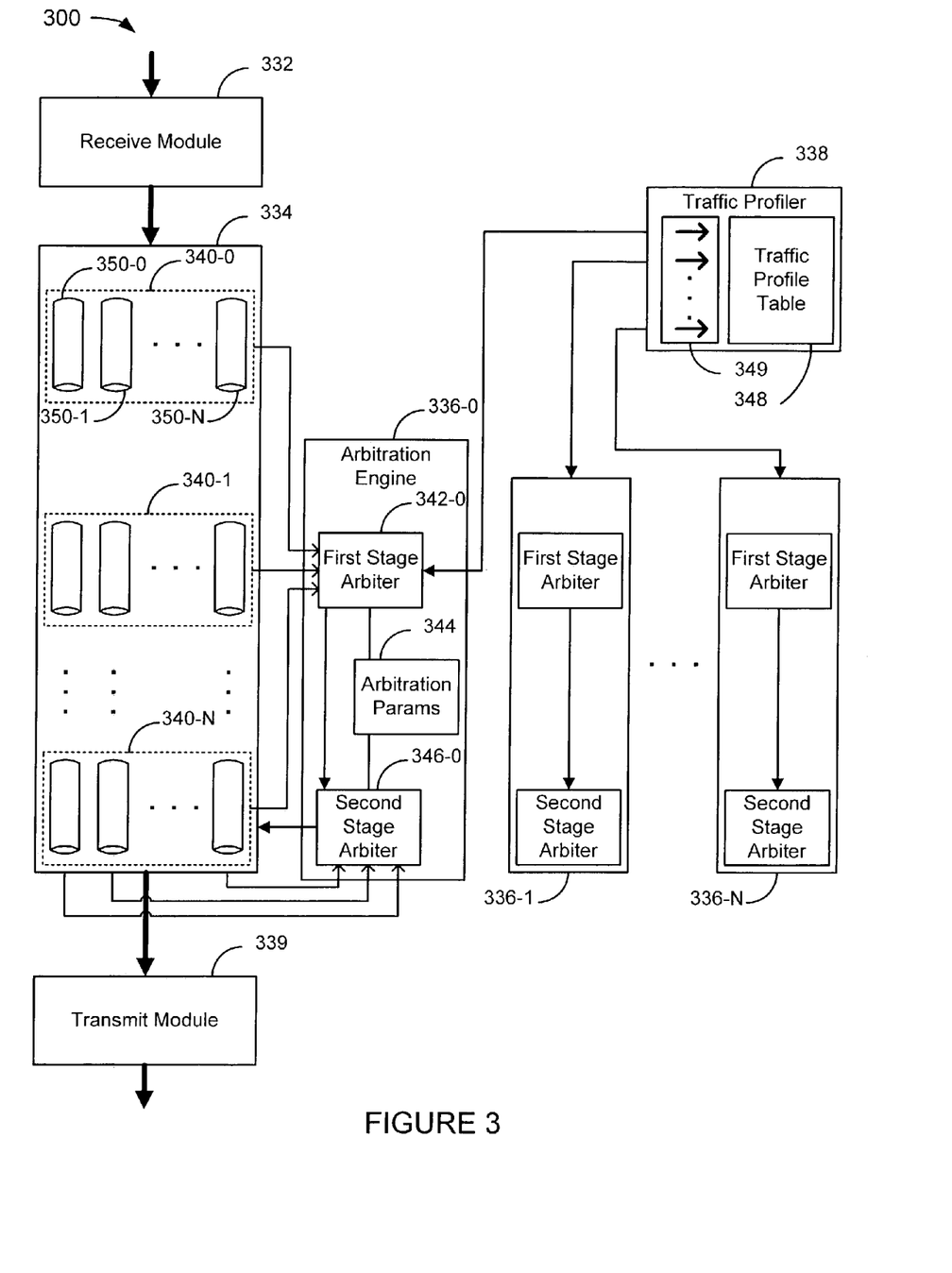
FIG. 3 is a block diagram of a switching fabric for use in the system of FIG. 1.

FIG. 3 is a block diagram of a switching fabric 300 for use with the system of FIG. 1. In an embodiment, the switching fabric 300 is analogous to the switching fabric module 130 (FIG. 1). The switching fabric 300 includes a receive module 332, fabric buffer module 334, multi-stage arbitration engine modules 336-0 to 336-N (collectively referred to as the arbitration engine 336), a traffic profiler 338, and a transmit module 339. The receive module 332 receives cell traffic from an ingress module, such as the ingress module 106-1 (FIG. 1).

The fabric buffer module 334 is configured to enqueue cells received by the receive module 332 according to the traffic class and channel associated with the cells. The fabric buffer module 334, which is logically organized into rows and columns, includes rows 340-0 to 340-N (collectively referred to as rows 340). The rows 340 are respectively associated with traffic classes. Accordingly, for example, each row is associated with a priority. The row 340-0 includes queues 350-0 to 350-N (collectively referred to as queues 350). The other rows 340 include a comparable set of queues logically organized in such a way that a column includes one queue from each of the rows 340. The columns of the fabric buffer module 334 are respectively associated with channels. In an embodiment, the number of channels equals the number of ingress modules coupled to the switching fabric 300 times the number of egress modules coupled to the switching fabric 300. For example, an alternative having 64 ingress modules 106 (FIG. 1) and 64 egress modules 108 (FIG. 1) also has 4096 channels (i.e., 64 ingress modules×64 egress modules->4096 channels). The channels from the ingress modules may be referred to as the channels of entry (COE). The channels to the egress modules may be referred to as the exit channels.

The arbitration engine 336 is configured to receive traffic profile requests from the traffic profiler 338. The traffic profile requests, which are discussed in more detail with reference to FIG. 4B, identify queues of the fabric buffer module 334 based on traffic class, COE, or other factors. The multi-stage arbitration engine module 336-0 includes a first stage arbiter 342-0, an arbitration parameters block 344, and a second stage arbiter 346-0. The other modules of the arbitration engine 336 include comparable components or, in alternative embodiments, share one or more components. The multistage arbitration engine modules 336-0 to 336-N are respectively associated with exit channels. Thus, an alternative having 64 egress modules 108 also has 64 multi-stage arbitration engine modules 336-0 to 336-N.

The traffic profiler 338 includes a traffic profile table 348 and a request generator 349. The traffic profiler 338 is a software-configurable device that generates a traffic profile request for a cell that may or may not be enqueued in the fabric buffer module 334. The request generator 349 includes a plurality of sets of pointers that are respectively associated with exit channels. In other words, each set of pointers is associated with an exit channel. The request generator 349 uses the set of pointers to cycle through the traffic profile table 348, selecting each valid table entry in turn, as described with reference to FIGS. 4A and 4B. The request generator 349 then generates a request including one or more fields of the table entry.

Figure 4A:
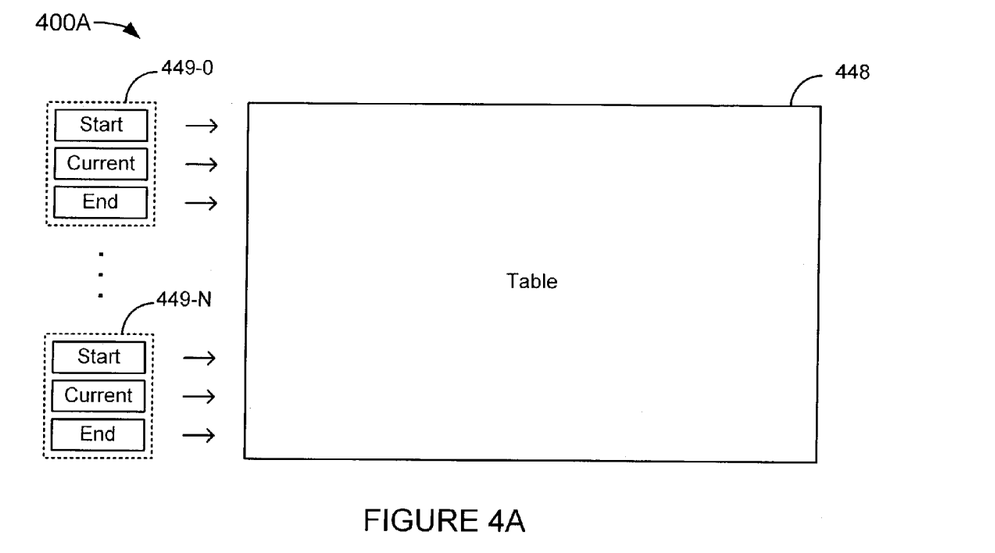
FIGS. 4A and 4B are block diagrams of components of a traffic profiler for use in the system of FIG. 3.

FIG. 4A is a block diagram of a traffic profiler 400A for use in the system of FIG. 3. In the embodiment of FIG. 4A, the traffic profiler 400A is analogous to the traffic profiler 338 (FIG. 3). The traffic profiler 400A includes a table 448 and sets of pointers 449-0 to 449-N (collectively referred to as sets of pointers 449). The sets of pointers 449 each include a start pointer, current pointer, and end pointer. Each of the pointers point to an entry in the table 448. For example, the start pointer points to a first entry that fits a first traffic profile associated with the exit channel with which the start pointer is associated. Similarly, the end pointer points to a second entry. The current pointer traverses the range of entries from the first entry to the second entry then starts again with the first entry. This is described with reference to FIG. 4B.

Figure 4B:
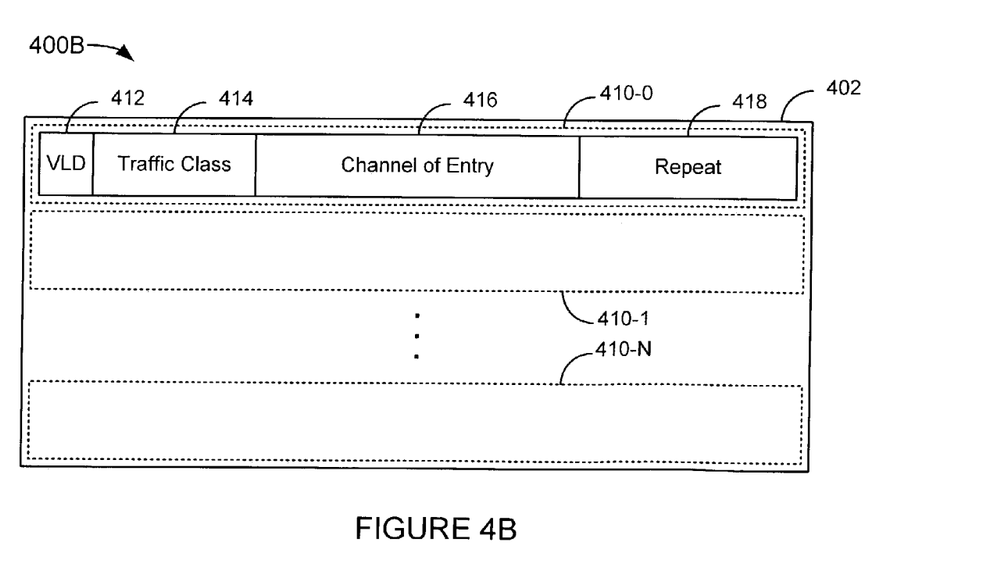

FIG. 4B is a block diagram of a table 400B for use in the system of FIG. 3. In the embodiment of FIG. 4B, the table 400B is analogous to the traffic profile table 348 (FIG. 3). The table 400B includes an array of table entries 402. The array 402 includes table entries 410-0 to 410-N (collectively referred to as table entries 410). Each of the table entries 410 includes fields similar to those of table entry 410-0, which include a valid (VLD) flag 412, traffic class field 414, COE field 416, and a repeat field 418. If the VLD flag 412 for one of the table entries 410 is not set, the table entry is not used to generate a request. The table 400B is organized such that the start pointer and end pointer of a set of pointers of the sets of pointers 404 defines a range of table entries. That range of table entries is the array 402. The start pointer of the set of pointers points to the first entry, table entry 410-0. The end pointer of the set of pointers points to the last entry, table entry 410-N. The current pointer of the set of pointers traverses the range of table entries from 410-0 to 410-N, then returns to 410-0. The traffic profiler 400A uses the current pointer to generate a request using the table entry to which the current pointer points. Since each of the table entries 410 include the traffic class field 414 and the COE field 416, the setting of the start and end pointers for each of the sets of pointers 404 results in a traffic profile preference. In an alternative, software modifies the entries between the start and end pointers to change the profile.

Over time, the current pointer traverses from the start pointer to the end pointer, pointing in turn to each table entry within that range. However, a non-zero value in the repeat field 418 causes the traffic profiler 400A to generate one additional request per value of the repeat field 418. For example, if the repeat field 418 for a table entry is set to 2, the traffic profiler 400A generates 3 requests using the table entry. Thus, the repeat field 418 effectively compresses the required table size allowing the table size to remain relatively small while providing more granularity on a per entry channel basis. In an alternative embodiment, instead of the repeat field 418, multiple table entries have the same traffic class and COE. In this alternative, a table used to profile traffic on a per-traffic class and per-COE basis includes one table entry for each traffic profile, plus additional redundant entries. The greater the number of redundant entries, the greater the degree of granularity in the requests generated by the traffic profiler.

With reference once again to FIG. 3, the arbitration engine 336 receives a request from the traffic profiler 338, modifies the request if necessary, and uses the request to arbitrate between cells queued in the fabric buffer module 334. The first stage arbiter 342 includes two sets of inputs: a first set of inputs is the requests received from the traffic profiler 338 for each exit channel and a second set of inputs is a plurality of flags respectively associated with each of the rows 340. The first stage arbiter 342 may receive additional input from the arbitration parameters block 344. The arbitration parameters block 344 includes parameters stored in memory that are set by software. In an embodiment, the software is supported off-chip. Using the arbitration parameters block 344 and the flags, the first stage arbiter 342 implements an arbitration algorithm that may be adjusted with software. Some exemplary implementations are discussed with reference to FIG. 5B. The flags indicate whether a cell is enqueued in any of the queues of the row with which the flag is associated. Since each of the rows 340 is associated with a traffic class, the flag indicates whether a cell of a given traffic class is enqueued. In an embodiment, the first stage arbiter 342 is configured to arbitrate between the traffic classes of cells enqueued in the fabric buffer module 334, as identified by the flags. Accordingly, the first stage arbiter 342 may be referred to as a traffic class arbiter. The first stage arbiter 342 may also be referred to as a "light" arbiter because it knows only a subset of the information regarding what is in the queues. In an embodiment, this information is derived from the input flags. The first stage arbiter 342 modifies the request so that the traffic class associated with the request matches the traffic class that wins arbitration and sends the modified request to the second stage arbiter 346. It should be noted that for the purposes of this specification, the request is referred to as a "modified request" even if the fields of the request received at the first stage arbiter 342 and the fields of the request sent from the first stage arbiter 342 are the same.

The first stage arbiter 342 reduces the amount of information required by the second stage arbiter 346 by modifying requests from the traffic profiler 338 based on the input flags and the additional software-controllable parameters from the arbitration parameters block 344. The second stage arbiter 346 receives the modified requests from the first stage arbiter 342 and implements a simplified arbitration algorithm to arbitrate between queues of the fabric buffer module 334. The algorithm may be adjusted with software much like the algorithm implemented by the first stage arbiter 342 is adjusted. Some exemplary implementations are discussed with reference to FIG. 5B. After the second stage arbiter 346 determines which queue is allowed to transmit a cell, the transmit module 339 transmits the cell to an egress module, such as the egress module 108-1 (FIG. 1), from the fabric buffer module 334.

It should be noted that, in an embodiment, there is no feedback from the arbitration engine 336 to the traffic profiler 338. Accordingly, the traffic profiler 338 is not a constant bit rate (CBR) shaper. The actual profile will only match the requested profile when cells are available in all profiled queues.

An example of a full cycle of operation involves receiving a plurality of cells at the receive module 332, enqueuing the cells in the fabric buffer module 334, generating a request at the traffic profiler 338, for an exit channel (e.g., channel 1), sending the request to the appropriate module of the arbitration engine 336 (e.g., arbitration engine module 336-1), modifying the request at the first stage arbiter 342 (e.g., by changing the traffic class associated with the request), arbitrating between cells using the modified request at the second stage arbiter 346 (e.g., a cell in the queue associated with exit channel 1, the traffic class of the modified request, and the COE of the modified request), and transmitting the cell that wins arbitration from the fabric buffer module 334 at the transmit module 339.

Figure 5A:
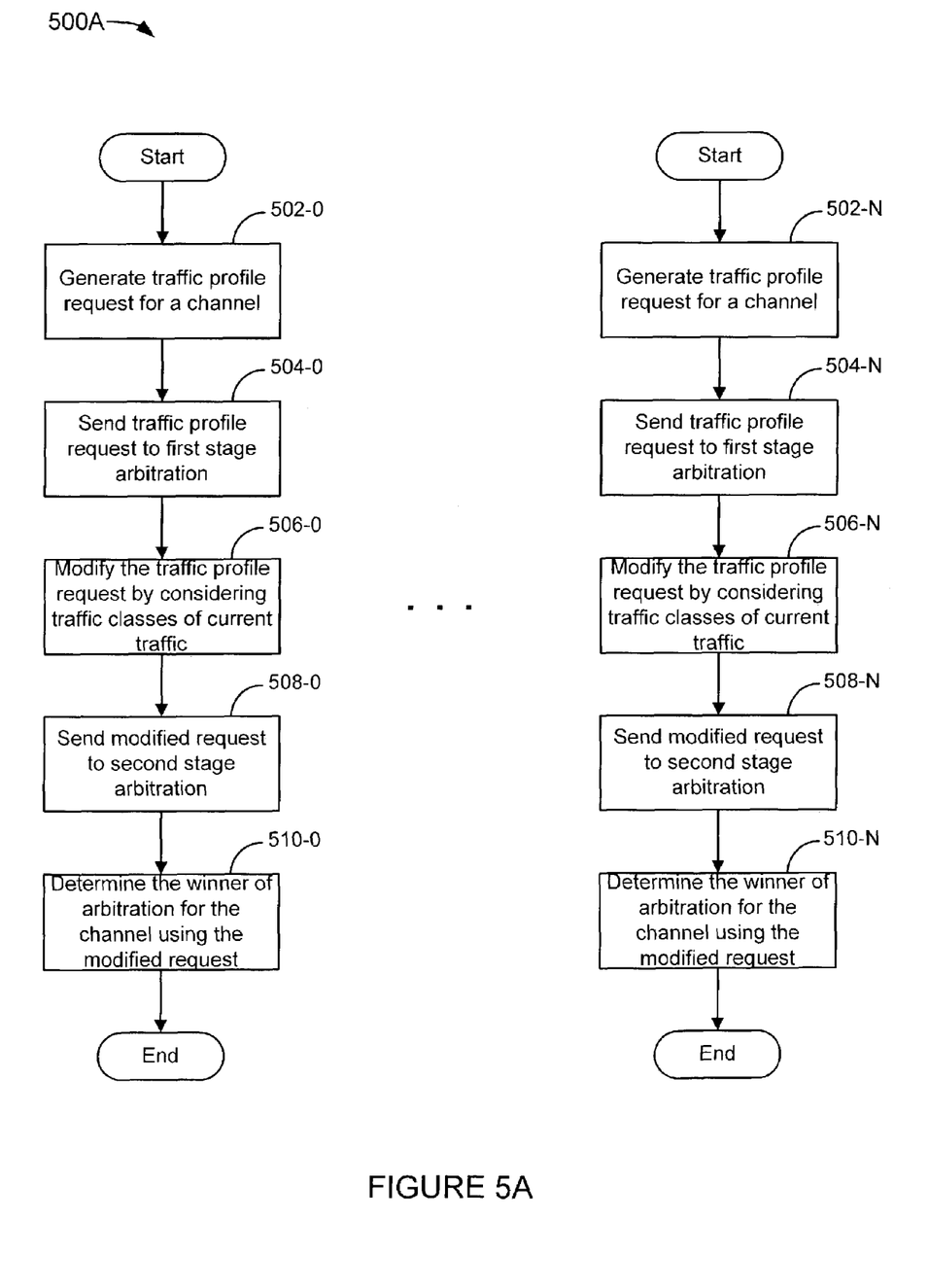
FIGS. 5A, 5B, and 5C are flowcharts of methods in accordance with embodiments of the invention.

FIG. 5A is a flowchart 500A of a method in accordance with an embodiment of the invention. FIG. 5A is intended to illustrate how the stages of the traffic profiling and multi-stage arbitration are performed in parallel for a plurality of channels. The flowchart 500A starts with generating a traffic profile request at step 5020 for a channel. In an embodiment, the channel is an exit channel (e.g., exit channel 0). In an alternative of this embodiment, the request identifies a traffic class and a COE. Accordingly, for a system that includes one channel per exit channel per traffic class per COE, the traffic profile request identifies a unique channel. The channel may or may not currently have traffic passing through it. The traffic profile request is sent to first stage arbitration at step 504-0. The first stage arbitration modifies the traffic profile request by considering traffic classes of current traffic at step 506-0. The first stage arbitration only considers the traffic classes that are represented in current traffic, not the channels associated with the current traffic. In an embodiment, the first stage arbitration modifies the traffic profile request according to a strict priority protocol when current traffic is above a strict priority threshold. Though the arbitration only considers the traffic class of current traffic, the first stage arbitration may modify the COE associated with the traffic profile request. The modified traffic profile request is then sent to second stage arbitration at step 508-0. The modified traffic profile request should include a traffic class with which at least some current traffic is associated. The second stage arbitration then determines the winner of arbitration for the channel using the modified request at step 510-0. If the channel is associated with exit channel 0, then the winner of arbitration will be traffic passing through exit channel 0.

It should be noted that in an alternative embodiment, if no traffic is available for the exit channel then traffic from a different exit channel might be declared winner of the arbitration, though this is not critical for the purposes of this description. After the flowchart 500A ends, the winner of arbitration is forwarded (not illustrated). The steps described above are performed in parallel for each channel of the plurality of channels. In an embodiment where the channels are exit channels, the steps 502-N 510-N are performed for exit channel N and steps are performed for exit channels 1 to N−1. These steps are comparable to the steps 502-0 to 510-0 just described.

Figure 5B:
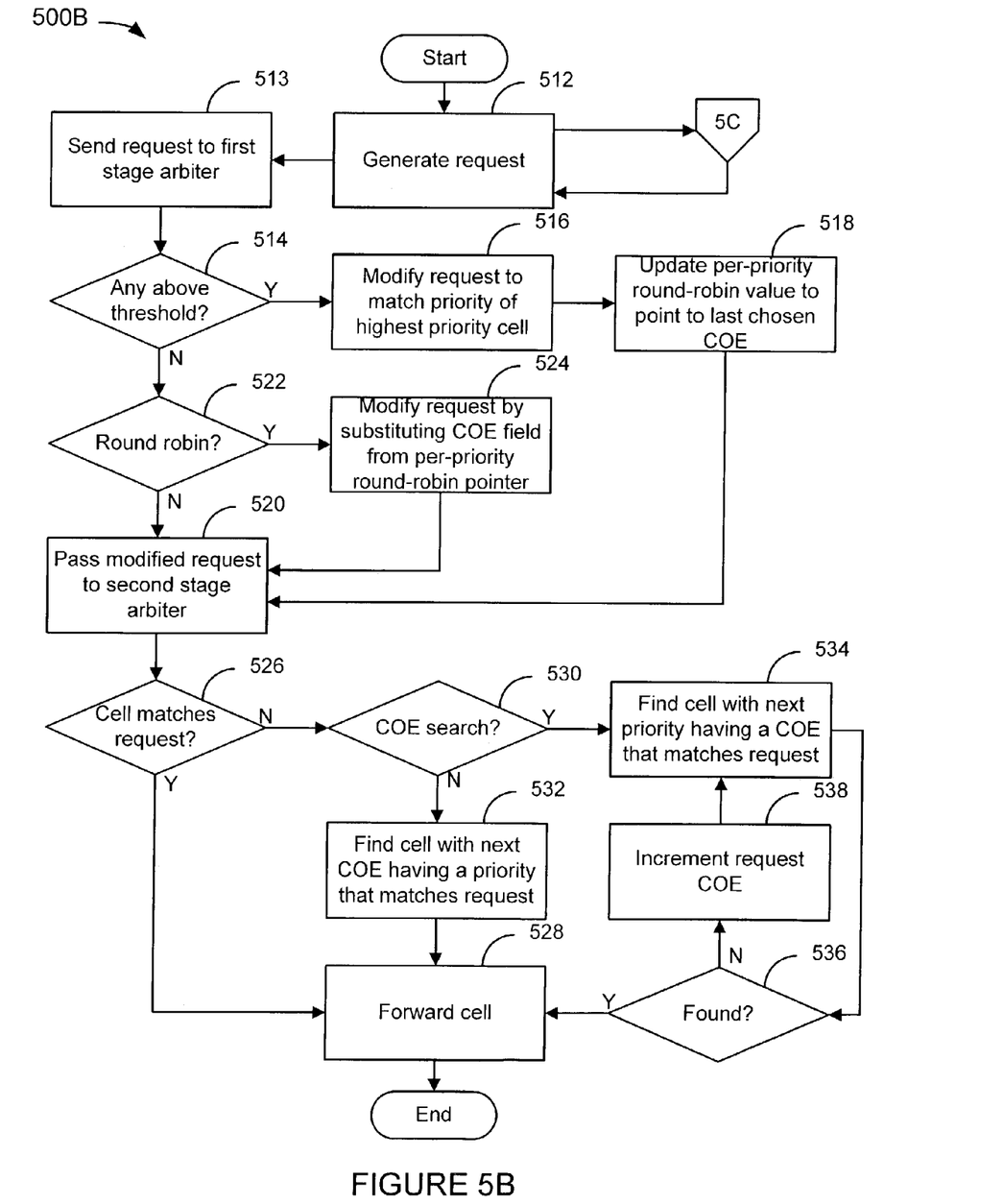

FIG. 5B is a flowchart 500B of a method in accordance with an embodiment of the invention. FIG. 5B is intended to illustrate an exemplary multi-stage arbitration for one exit channel. In FIG. 5B, the traffic class associated with requests and queues is referred to as priority. The flowchart 500B starts with generating a traffic profile request at step 512. Since, in an embodiment, a traffic profiler, such as the traffic profiler 338, does not wait for feedback from arbiters, the traffic profiler will continue to generate requests. The continued generation of requests following step 512 is discussed later with reference to FIG. 5C.

After a request is generated at step 512, the request is sent to the first stage arbiter at step 513 and it is determined at decision point 514 whether any cells are enqueued in queues associated with a priority that is above a preset threshold. Using the preset threshold, cells with a priority that is high enough are forwarded on a strict priority basis. If a cell with a priority above the threshold is enqueued, the request is modified to match the priority of the highest priority cell enqueued at step 516, a per-priority round-robin value is set to point to the last chosen channel of entry at step 518, and the request is passed on to the second stage arbiter at step 520. In other words, a strict priority is enforced for cells in queues associated with a priority that is above the preset threshold. The per-priority round-robin value is set to the last queue that won arbitration prior to a strict priority arbitration. Then the arbitration algorithm continues with the queue that would have followed had the strict priority mechanism not taken over. In that way the strict priority algorithm does not starve any queues. Thus, the per-priority round-robin value facilitates fairness. It should be noted that strict priority queues are no different from other queues with respect to the generation of requests; the strict priority mechanism is in addition to this.

If it is determined that no queues are above the strict priority threshold (514N), then it is determined at decision point 522 whether the request should be modified in accordance with the relevant per-priority round-robin pointer. If not, then the request is passed on as is to the second stage arbiter at step 520. Otherwise, the request is modified by substituting a COE field currently associated with the relevant per-priority round-robin pointer into the COE field of the request at step 524 and the request is passed on to the second stage arbiter at step 520.

At step 520, the request is for a priority that has cells enqueued. At decision point 526 it is determined whether a queued cell matches the request. If so, that cell is forwarded at step 528 and the flowchart 500B ends. If not, then it is determined at step 530 whether to perform a COE search. If not, then the next cell having the priority indicated in the request is found at step 532 and the cell is forwarded at step 528 and the flowchart 500B ends. In an embodiment, the next cell is found using a round-robin pointer that cycles through each cell of a given priority. In this case, one round-robin pointer is required for each priority. Otherwise, if a COE search is preferred (530-Y), the arbitration algorithm attempts to find a cell matching the COE of the request for a next priority after that of the request at step 534. In an embodiment, the next priority is determined by checking each priority for a cell that matches the COE of the request. At decision point 536, it is determined whether a next priority has been found. If a next priority is found, then the cell that matches the COE of the request that has the highest priority is forwarded at step 528. If a next priority is not found, then the COE of the request is incremented at step 538 and steps 534-538 are repeated until a cell that matches the modified COE of the request is found. Then the cell that matches the COE of the modified request that has the highest priority is forwarded at step 528 and the flowchart 500B ends. When the flowchart 500B ends, the request generated at step 512 has presumably been carried out and the request may be discarded.

Figure 5C:
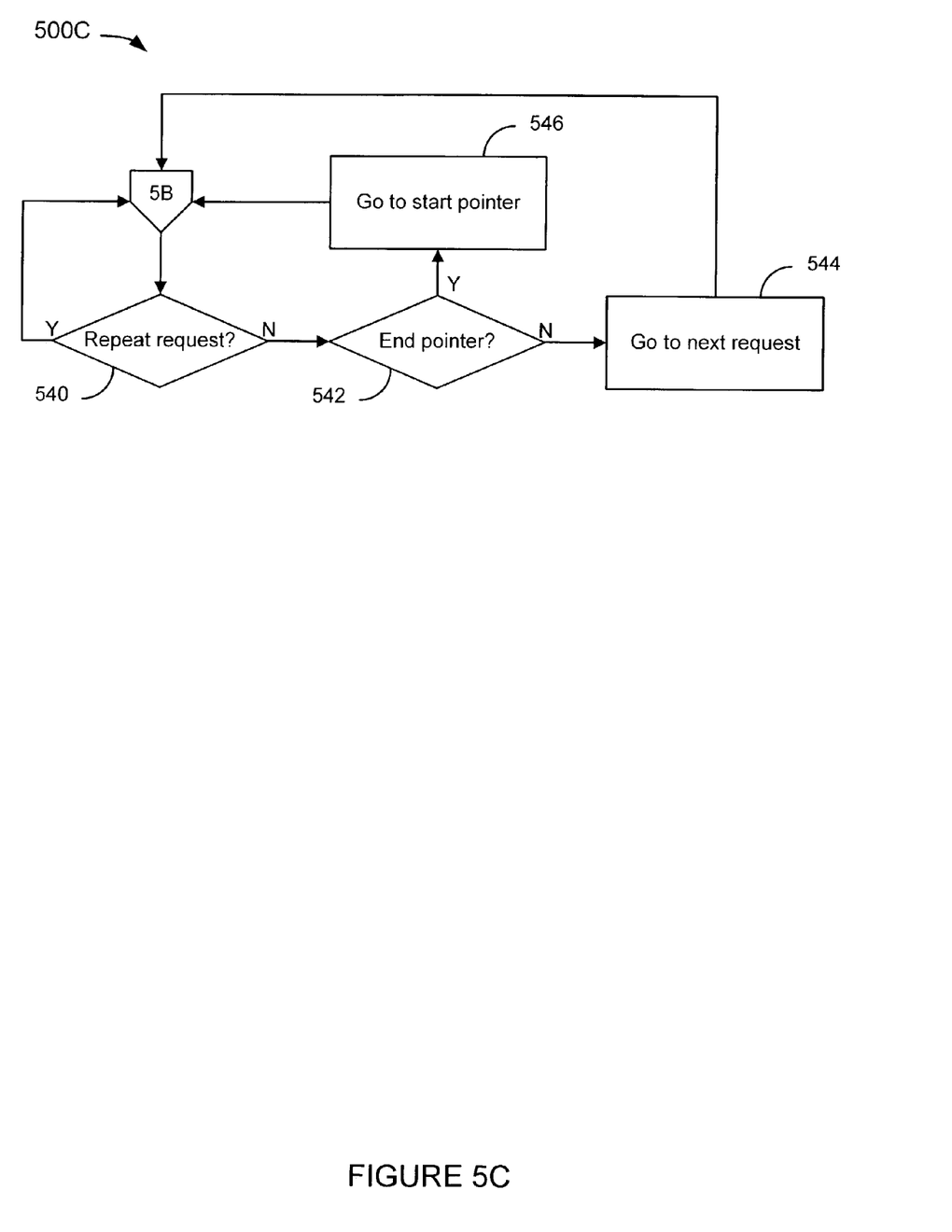

FIG. 5C is a flowchart 500C of a method in accordance with an embodiment of the invention. FIG. 5C is intended to illustrate continued generation of requests after a request is generated at step 512 (FIG. 5B). At decision point 540 it is determined whether the last request should be repeated. If so, then the flowchart 500C returns to step 512 (FIG. 5B) where the request is generated again and the flowchart 500B continues as described previously. In an embodiment, a counter associated with the request begins with a value indicative of the number of times the request is to be repeated. Then, when the request is repeated, the count is decremented. When the count reaches zero, the request is no longer repeated.

If the request should not be repeated (540-N), then it is determined whether the request is associated with an end pointer at decision point 542. In an embodiment, a traffic profiler makes this determination automatically when each of an array of traffic profiles has been used to generate requests and the pointer that traverses the array has reached the end. If the end pointer has not been reached, then the traffic profiler goes to the next traffic profile at step 544, a request is generated at step 512 (FIG. 5B) for that profile, and the flowchart 500B continues as described previously. Otherwise, if the end of the array has been reached (542-Y), then the traffic profiler starts again at the start of the array at step 546, a request is generated at step 512 (FIG. 5B) for that profile, and the flowchart 500B continues as described previously.

In one embodiment, the method steps described above are embodied in a computer-readable media as computer instruction code. It shall be appreciated that not all methods steps described must be performed, nor must they be performed in the order stated.

It should be noted that in an embodiment, packets are broken up into cells for forwarding. Since multiple cells may make up a single packet, an egress queue may have to wait for a cell containing an end-of-packet indicator before reassembling cells into a packet. Since egress queues sometimes reassemble packets from multiple cells, they may be referred to as reassembly queues. As used herein, the term cell is defined broadly to include fixed length cells, variable length cells, and packets.

The term traffic class is defined broadly to include any manner of identifying traffic in a packet- (or cell-) based traffic forwarding system. This includes, but is not limited to, priority, channel of entry, and exit channel.

It should be further noted that in an embodiment the system includes one multi-stage arbitration module per exit channel and the traffic profile table includes a channel of entry field. In an alternative embodiment, the system includes one multi-stage arbitration module per channel of entry and the traffic profile table includes an exit channel field. In other alternatives, the table includes both a channel of entry field and an exit channel field and the system includes as few as one multi-stage arbitration modules. Furthermore, the term channel is broadly defined to include any subset of channels in the system.

Although specific embodiments of the invention have been described and illustrated, the invention is not to be limited to the specific forms or arrangements of parts as described and illustrated herein. The invention is limited only by the claims.

What is claimed is:

1. A method of arbitration at a switching fabric, comprising:
receiving cells from an ingress, wherein each of the cells has an associated traffic class of a plurality of traffic classes;
generating a request at a traffic profiler;
performing a multi-stage arbitration, including:
performing a first stage arbitration to modify the request according to which traffic classes of the plurality of traffic classes are represented by cells received from the ingress that have the traffic classes; and
performing a second stage arbitration using the modified request to select a cell of the cells received from the ingress as winner of the multi-stage arbitration; and
forwarding the cell to an egress.

2. The method of claim 1, said generating further comprising:
generating the request without using feedback from the multi-stage arbitration.

3. The method of claim 1, wherein said plurality of traffic classes have associated priorities, said performing said first stage arbitration further comprising:
determining a threshold above which cells are forwarded on a strict priority basis; and
modifying the request to match a highest priority traffic class at or above the threshold that is represented by cells received from the ingress.

4. The method of claim 3, said performing said first stage arbitration further comprising:
using a per-priority round-robin value to ensure fairness after forwarding cells on a strict priority basis.

5. The method of claim 1, further comprising:
configuring the first stage arbitration using software.

6. The method of claim 1, said performing said second stage arbitration further comprising:
using the modified request to select the cell as winner of the multi-stage arbitration in accordance with an arbitration algorithm.

7. The method of claim 6, said performing said second stage arbitration further comprising:
using the modified request to select the cell as winner of the multi-stage arbitration if the cell matches the modified request.

8. The method of claim 6, said performing said second stage arbitration further comprising:
using the modified request to select the cell as winner of the multi-stage arbitration if the traffic class of the cell matches the modified request.

9. The method of claim 1, further comprising:
configuring the second stage arbitration using software.

10. The method of claim 1, said generating further comprising:
generating additional requests in subsequent steps in accordance with a repeat field of the request.

11. A traffic forwarding system having one or more channels of entry (COE) and one or more exit channels, comprising:
a receive module configured to receive traffic on COE, wherein the received traffic includes cells with associated traffic classes;
a fabric buffer module configured to enqueue cells received by the receive module according to the associated traffic classes and the COE;
a traffic profiler module configured to generate a request for a cell with a specified traffic class, the traffic profiler including:
a traffic profile table with entries having fields associated with traffic classes; and
a request generator configured to generate requests using one or more of the fields of the entries;
a multi-stage arbitration engine configured to receive the request from the traffic profiler module, including:
a first stage arbiter, configured to arbitrate between traffic classes of the cells received at the receive module and modify the request accordingly; and
a second stage arbiter, configured to arbitrate between the cells received at the receive module using the modified request; and
a transmit module configured to forward cells that win arbitration at the multi-stage arbitration engine on one of one or more exit channels.

12. The system of claim 11, said traffic profile table further comprising:
entries having fields associated with COE, wherein the traffic profiler module is further configured to generate the request for the cell with a specified channel of entry.

13. The system of claim 11, said request generator further configured to:
use a plurality of sets of pointers configured to traverse the traffic profile table.

14. The system of claim 13, said plurality of sets of pointers further comprising:
one set of pointers for each exit channel.

15. The system of claim 13, said sets of pointers further comprising:
a start pointer configured to identify a start of a range of table entries;
an end pointer configured to identify an end to the range of table entries; and
a current pointer configured to traverse the range of table entries from the start to the end.

16. The system of claim 11, further comprising:
a plurality of multi-stage arbitration engines, including the multi-stage arbitration engine, independently associated with each exit channel.

17. The system of claim 11, said first stage arbiter further configured to:
receive the request,
receive a plurality of traffic class flags associated with a respective plurality of traffic classes, wherein a traffic class flag is indicative of whether the cells have the associated traffic class of the traffic class flag;
arbitrate between traffic classes of the cells according to arbitration parameters; and
modify the request in accordance with the arbitration.

18. The system of claim 17, said second stage arbiter further configured to:
   receive the modified request from the first stage arbiter; and
   arbitrate between the cells according to the modified traffic profile request and arbitration parameters.

19. An arbitration engine configured to arbitrate between one or more cells enqueued at a switching fabric, comprising:
   a first stage arbiter, configured to:
      receive a traffic profile request;
      receive a plurality of traffic class flags associated with a respective plurality of traffic classes, wherein a traffic class flag is indicative of whether one or more cells enqueued at a switching fabric have the associated traffic class of the traffic class flag;
      arbitrate between traffic classes, for which one or more cells are enqueued, according to arbitration parameters; and
      modify the traffic profile request in accordance with the arbitration; and
   a second stage arbiter, configured to:
      receive the modified traffic profile request from the first stage arbiter; and
      arbitrate between the enqueued cells according to the modified traffic profile request and arbitration parameters.

* * * * *